United States Patent
Meneboo et al.

(10) Patent No.: US 12,540,868 B2
(45) Date of Patent: Feb. 3, 2026

(54) SYSTEMS AND METHODS FOR FIXING A LIQUID COOLING BLOCK ON A HEAT-GENERATING ELECTRONIC COMPONENT

(71) Applicant: OVH, Roubaix (FR)

(72) Inventors: Alexandre Alain Jean-Pierre Meneboo, Harnes (FR); Gregory Francis Louis Bauchart, Wattrelos (FR); Ali Chehade, Moncheaux (FR)

(73) Assignee: OVH, Roubaix (FR)

( * ) Notice: Subject to any disclaimer, the term of this patent is extended or adjusted under 35 U.S.C. 154(b) by 231 days.

(21) Appl. No.: 18/232,398

(22) Filed: Aug. 10, 2023

(65) Prior Publication Data

US 2024/0060833 A1   Feb. 22, 2024

(30) Foreign Application Priority Data

Aug. 18, 2022   (EP) .................................... 22306239

(51) Int. Cl.
| | | |
|---|---|---|
| G01L 1/04 | (2006.01) | |
| H05K 7/20 | (2006.01) | |
| G06F 1/20 | (2006.01) | |

(52) U.S. Cl.
CPC ............ *G01L 1/04* (2013.01); *H05K 7/20272* (2013.01); *G06F 1/20* (2013.01); *G06F 2200/201* (2013.01)

(58) Field of Classification Search
CPC ......... G01L 1/04; H05K 7/20272; G06F 1/20; G06F 2200/201; H01L 23/473;
(Continued)

(56) References Cited

U.S. PATENT DOCUMENTS 6,683,449 B1 *  1/2004  Bell .................... H01L 23/4093
                                                           257/718
7,187,553 B2   3/2007  Schmidberger
(Continued)

FOREIGN PATENT DOCUMENTS

| CN | 105929915 A | 9/2016 |
|---|---|---|
| EP | 0563668 A2 | 10/1993 |

(Continued)

OTHER PUBLICATIONS

Office Action with regard to the counterpart EP Patent Application No. 22306239.9 dated Mar. 14, 2024.
(Continued)

*Primary Examiner* — Stephen S Sul
(74) *Attorney, Agent, or Firm* — BCF LLP

(57) ABSTRACT

A fixing system for fixing a liquid cooling block on a heat-generating electronic component, the fixing system comprising a mounting bracket and an indicator. The mounting bracket comprises a main portion overlying at least part of the liquid cooling block in order to urge the liquid cooling block against the heat-generating electronic component, and an outer connecting portion extending from the main portion and configured to be fastened to a substrate on which the heat-generating electronic component is disposed. The indicator is disposed between the main portion and the liquid cooling block, and undergoes deformation in response to the outer connecting portion being progressively fastened to the substrate in order to provide an indication to a user that a desired amount of pressure is exerted between the mounting bracket and the liquid cooling block for establishing adequate contact between the liquid cooling block and the heat-generating electronic component.

8 Claims, 9 Drawing Sheets

(58) Field of Classification Search
CPC . H01L 23/4093; H01L 23/4006; H01L 21/50; H01L 2023/4087
See application file for complete search history.

(56) References Cited

U.S. PATENT DOCUMENTS

| | | | |
|---|---|---|---|
| 9,894,748 B2 | 2/2018 | Tsunoda et al. | |
| 10,429,907 B2 | 10/2019 | Saito et al. | |
| 10,592,991 B2 | 3/2020 | Brown | |
| 10,605,538 B2 | 3/2020 | Ahamed et al. | |
| 11,139,732 B2 | 10/2021 | Youssef et al. | |
| 11,382,241 B2* | 7/2022 | Gao | H05K 7/20772 |
| 2004/0250992 A1* | 12/2004 | Aoki | H05K 7/20727 |
| | | | 165/80.4 |
| 2005/0099172 A1* | 5/2005 | Durham | H01L 22/34 |
| | | | 324/763.01 |
| 2007/0074851 A1 | 4/2007 | Lin | |
| 2020/0101570 A1 | 4/2020 | Potter et al. | |
| 2020/0357752 A1* | 11/2020 | Yazzie | H01L 23/562 |
| 2021/0136956 A1* | 5/2021 | Paavola | F28D 15/0275 |
| 2021/0274673 A1 | 9/2021 | Blackburn et al. | |
| 2022/0312637 A1* | 9/2022 | Norton | H05K 7/20772 |
| 2022/0386510 A1* | 12/2022 | Chen | H05K 1/0203 |
| 2025/0169030 A1* | 5/2025 | Edmunds | H01L 23/4006 |

FOREIGN PATENT DOCUMENTS

| | | |
|---|---|---|
| JP | 6557112 B2 | 8/2019 |
| KR | 20210128775 A | 10/2021 |
| WO | 2021210957 A2 | 10/2021 |

OTHER PUBLICATIONS

European Search Report with regard to the EP Patent Application No. 22306239.9 completed Feb. 7, 2023.
English Abstract for CN105929915 retrieved on Espacenet on Jul. 12, 2023.
English Abstract for JP6557112 retrieved on Espacenet on Jul. 12, 2023.
English Abstract for KR20210128775 retrieved on Espacenet on Jul. 12, 2023.
English Abstract for EP0553668 retrieved on Espacenet on Jul. 12, 2023.

* cited by examiner

SYSTEMS AND METHODS FOR FIXING A LIQUID COOLING BLOCK ON A HEAT-GENERATING ELECTRONIC COMPONENT

CROSS REFERENCE

The present application claims priority to EP Application No. 22306239.9, filed Aug. 18, 2022 entitled "Systems and Methods for Fixing a Liquid Cooling Block On a Heat-Genrating Electronic Component", the entirety of which is incorporated herein by reference.

FIELD

The present technology relates to cooling arrangements for electronic equipment.

BACKGROUND

Heat dissipation is an important consideration for computer systems. Notably, many components of a computer system, such as a processor (for example a central processing unit (CPU), a graphical processing unit (GPU), and the like), generate heat and thus require cooling to avoid performance degradation and, in some cases, failure. Similar considerations arise for systems other than computer systems (e.g., power management systems). Different types of cooling systems are therefore implemented to promote heat dissipation from heat-generating electronic components, with the objective being to efficiently collect and conduct thermal energy away from heat-generating electronic components.

Heat sinks rely on a heat transfer medium (e.g., a gas or liquid) to carry away the heat generated by a heat-generating electronic component. For example, a water block, which is a water cooling heat sink, is thermally coupled to the component to be cooled (e.g., a processor) and water, or other heat transfer fluid, is made to flow through a conduit in the water block to absorb heat from the heat-generating electronic component. As water flows out of the water block, so does the thermal energy collected thereby.

Such solutions typically rely on disposing and maintaining the water block in mechanical contact with the heat-generating electronic component such that thermal energy may be collected by the water block and carried away from the heat-generating electronic component. However, excessive contact pressure between the water block and the heat-generating electronic component may damage the heat-generating electronic component. For instance, excessive mechanical pressure exerted on the heat-generating electronic component may cause physical impairment of the heat-generating electronic component. Moreover, in some cases, such excessive contact pressure may increase a temperature of the heat-generating electronic component, thereby minimizing or negating the cooling provided by the water block. Indeed, due to the excessive mechanical pressure exerted on the heat-generating electronic component, parts of the heat-generating electronic component (e.g. dies, capacitors, etc.) may undergo mechanical deformation and/or be forced closer one to another, resulting in greater heat generation.

There is therefore a desire for reliable and controlled fixing of a water block on a heat-generating electronic component that alleviates at least some of the aforementioned drawbacks.

SUMMARY

It is an object of the present technology to ameliorate at least some of the inconveniences present in the prior art.

In one aspect, various implementations of the present technology provide a fixing system for fixing a liquid cooling block on a heat-generating electronic component. The fixing system comprises a mounting bracket and an indicator. The mounting bracket comprises a main portion configured to overlie at least part of the liquid cooling block in order to urge the liquid cooling block against the heat-generating electronic component and an outer connecting portion extending from the main portion, the outer connecting portion being configured to be fastened to a substrate on which the heat-generating electronic component is disposed. The indicator is configured to be disposed between the main portion and the liquid cooling block. In use, the indicator is configured to undergo deformation in response to the outer connecting portion being progressively fastened to the substrate in order to provide an indication to a user that a desired amount of pressure is exerted between the mounting bracket and the liquid cooling block for establishing adequate contact between the liquid cooling block and the heat-generating electronic component.

In some embodiments, a magnitude of the deformation of the indicator in response to the outer connecting portion being progressively fastened to the substrate provides a visual indication to the user of adequate contact between the liquid cooling block and the heat-generating electronic component.

In some embodiments, the indicator comprises a resilient member that is connected to the mounting bracket, the resilient member being deformable in response to getting compressed between the main portion and the liquid cooling block as the outer connecting portion is progressively fastened to the substrate.

In some embodiments, part of the resilient member is slidable along the mounting bracket.

In some embodiments, the resilient member comprises a first end portion and a second end portion, the first end portion is configured to be fixedly connected to the mounting bracket; and the second end portion is configured to be slidable along the mounting bracket such that, in response to the outer connecting portion being progressively fastened to the substrate, the second end portion slides along the main portion of the mounting bracket.

In some embodiments, the resilient member is deformable into a flat configuration in response to the desired amount of pressure being exerted between the mounting bracket and the liquid cooling block.

In some embodiments, the resilient member is a resilient plate.

In some embodiments, the resilient member has, at rest, a vertex configured to be oriented towards the liquid cooling block.

In some embodiments, the fixing system further comprises an electric circuit comprising a first electrical contact connected to the resilient member, a second electrical contact connected to the main portion of the mounting bracket, in use, the first and second electrical contacts being operable to contact each other in response to the resilient member being deformed by a given magnitude corresponding to the desired amount of pressure being exerted between the mounting bracket and the liquid cooling block, an electrical indication device for indicating presence of an electric current flowing between the first and second electrical contacts; and a power source for powering the electric circuit. In an open state of the electric circuit, the first electrical contact and the second electrical contact are spaced from each other such that electricity is not transmitted to the electrical indication device. In a closed state of the electric circuit, the first electrical contact and the second electrical contact are in electrical communication with each other such that electricity is transmitted to the electrical indication device. The electrical indication device is configured to, in the closed state of the electric circuit, indicate to the user that adequate contact is established between the liquid cooling block and the heat-generating electronic component.

In some embodiments, the resilient member is a resilient plate made of metallic material, the resilient plate being electrically isolated from the mounting bracket.

In a second aspect, various implementations of the present technology provide a cooling assembly comprising a liquid cooling block and the aforementioned fixing system for fixing the liquid cooling block on a heat-generating electronic component. The liquid cooling block defines an internal fluid conduit, the liquid cooling block having an inlet and an outlet for respectively receiving and discharging cooling fluid from the internal fluid conduit, the liquid cooling block comprising an external thermal transfer surface configured to be in thermal contact with the heat-generating electronic component for cooling thereof. The indicator is configured to be disposed between the main portion and the liquid cooling block, wherein, in use, the indicator is configured to undergo deformation in response to the outer connecting portion being progressively fastened to the substrate in order to provide an indication to a user that a desired amount of pressure is exerted between the mounting bracket and the liquid cooling block for establishing adequate contact between the liquid cooling block and the heat-generating electronic component.

In a third aspect, various implementations of the present technology provide a method for fixing a liquid cooling block on a heat-generating electronic component. The method comprises placing the liquid cooling block in thermal contact with the heat-generating electronic component, positioning a mounting bracket such that a main portion thereof overlies the liquid cooling block, an indicator being connected to the main portion of the mounting bracket such that the indicator is disposed between the main portion and the liquid cooling block, progressively fastening an outer connecting portion of the mounting bracket extending from the main portion to a substrate on which the heat-generating electronic component is disposed in order to urge the liquid cooling block against the heat-generating electronic component, the indicator deforming between the main portion and the liquid cooling block in response to said progressively fastening of the outer connecting portion, and ceasing fastening of the outer connecting portion to the substrate based on a deformation of the indicator that indicates that a desired amount of pressure is exerted between the mounting bracket and the liquid cooling block to establish adequate contact between the liquid cooling block and the heat-generating electronic component.

In some embodiments, a shape of the indicator is indicative of the desired amount of pressure being exerted between the mounting bracket and the liquid cooling block.

In some embodiments, the indicator has a flat configuration at the desired amount of pressure exerted between the mounting bracket and the liquid cooling block.

In some embodiments, the indicator comprises a resilient member that is connected to the mounting bracket.

In some embodiments, a first electrical contact is connected to the resilient member, a second electrical contact is connected to the main portion of the mounting bracket, the first and second electrical contacts being operable to contact each other in response to the resilient member being deformed by a given magnitude corresponding to the desired amount of pressure being exerted between the mounting bracket and the liquid cooling block, an electrical indication device is activated in response to the first and second electrical contacts being in electrical communication with each other; and ceasing fastening of the outer connecting portion to the substrate is based on activation of the electrical indication device.

In the context of the present specification, unless expressly provided otherwise, electronic equipment may refer, but is not limited to, "servers", "electronic devices", "operation systems", "systems", "computer-based systems", "controller units", "monitoring devices", a "control devices" and/or any combination thereof appropriate to the relevant task at hand.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
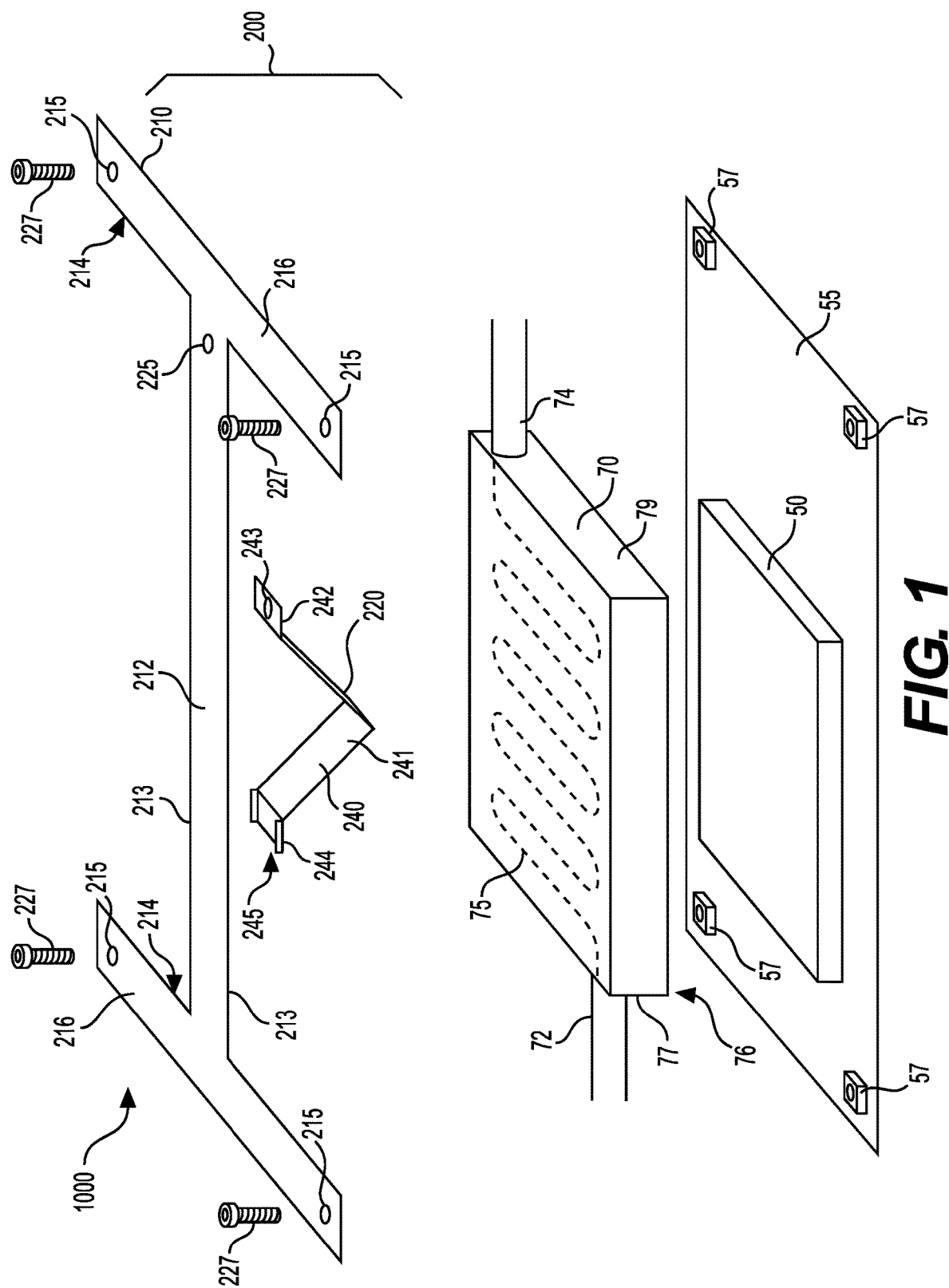
FIG. 1 is a perspective view, taken from a top, front, right side, of a cooling assembly in accordance with an embodiment of the present technology, shown in an exploded configuration.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various systems that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

An aspect of the present technology introduces a fixing system and a method for fixing a liquid cooling block (sometimes referred to as "water block" or "cold plate") on a heat-generating electronic component, for example a processor, with controlled mechanical contact pressure between the liquid cooling block and the heat-generating electronic component. In one embodiment, the fixing system comprises a mounting bracket and an indicator, the indicator being in use, disposed between the main portion and the liquid cooling block. The indicator undergoes deformation in response to the mounting bracket being fastened to a substrate of the heat-generating electronic component such as to provide an indication that a desired amount of pressure is exerted between the mounting bracket and the liquid cooling block to ensure adequate contact between the liquid cooling block and the heat-generating electronic component. The contact can be said to be adequate when thermal energy transfer is optimized without affecting or damaging the heat-generating electronic component due to high contact pressure.

For example, when the liquid cooling block is disposed in contact with the heat-generating electronic component and upon fixing the liquid cooling block on the heat-generating electronic component with the fixing system, the user may stop increasing the contact pressure exerted onto the heat-generating electronic component in response to the indicator indicating that the desired pressure has been reached.

With these fundamentals in place, we will now consider some non-limiting examples to illustrate various implementations of aspects of the present technology.

FIG. 1 shows a cooling assembly 1000 for cooling a heat-generating electronic component 50 in accordance with an embodiment of the present technology. As can be seen, the cooling assembly 1000 comprises a liquid cooling block 70 that is, in use, disposed in contact with the heat-generating electronic component 50, and a fixing system 200 for fixing the liquid cooling block 70 on the heat-generating electronic component 50. The heat-generating electronic component 50 is a component of an electronic device such as a computer system. For instance, in this example, the heat-generating electronic component 50 is a processor of a computer system. The computer system may be, for example, a server stored in a server rack of a data center. It is contemplated that the electronic device may be any other suitable electronic device. As can be seen, the heat-generating electronic component 50 is disposed on and connected to a substrate 55. The substrate 55 supports the heat-generating electronic component 50. In some cases, the substrate 55 may also have electronic connections to electrically connect the heat-generating electronic component 50 to other components. For example, the substrate 55 may be a printed circuit board (PCB), such as a motherboard of the computer system. Other types of substrates 55 are also contemplated.

The liquid cooling block 70 is a heat sink that uses a cooling fluid (e.g., a liquid such as water) for absorbing thermal energy. It is to be understood that the term "liquid cooling block" is intended to include such thermal transfer devices that use water, or any fluids other than water and/or multiphase flow (e.g., two-phase flow). For example, in some instances, the fluid may be an oil, an alcohol, or a dielectric heat transfer fluid (e.g., 3M Novec C).

As shown in FIG. 1, the liquid cooling block 70 defines an internal fluid conduit 75 (shown in dashed lines) through which, in use, the cooling fluid circulates. The internal fluid conduit 75 describes a path along which the cooling fluid flows while traversing the liquid cooling block 70. The path described by the internal fluid conduit 75 may have any suitable shape. For instance, in this example, as can be seen in FIG. 1, the internal fluid conduit 75 defines a generally serpentine path. The liquid cooling block 70 has a fluid inlet 72 and a fluid outlet 74 for respectively feeding cooling fluid into and discharging cooling fluid from the internal fluid conduit 75. An external thermal transfer surface 76 of the liquid cooling block 70, provided on an underside of the liquid cooling block 70 in this example, is configured to be in thermal contact with the heat-generating electronic component 50. It is to be understood that in this context, the external thermal transfer surface 76 is said to be in "thermal contact" with the heat-generating electronic component 50 whether the liquid cooling block 70 is in direct contact with the heat-generating electronic component 50 or when a thermal paste or thermal pad is applied between the external thermal transfer surface 76 and the heat-generating electronic component 50, in a manner that is known in the art, to ensure adequate heat transfer between the heat-generating electronic component 50 and the external thermal transfer surface 76.

In use, the cooling fluid received into the fluid inlet 72 is cold. As the cooling fluid flows along the path defined by the internal fluid conduit 75, the cooling fluid absorbs heat that has been transferred to a body of the liquid cooling block 70 via the external thermal transfer surface 76. The now-heated cooling fluid then flows out of the fluid outlet 74, thereby dissipating the thermal energy absorbed from the heat-generating electronic component 50.

The liquid cooling block 70 may form part of a cooling loop of a server rack that includes other various similar liquid cooling blocks (e.g., for cooling other heat-generating electronic components of the same electronic device, and/or the heat-generating electronic components of other electronic devices). In some embodiments, the cooling loop of which the liquid cooling block 70 forms a part may further comprise a heat exchanger fluidly connected to the liquid cooling block 70 and configured for receiving the heated cooling fluid from the liquid cooling block 70. As such, the heated cooling fluid discharged from the liquid cooling block 70 is cooled in the heat exchanger before returning to the liquid cooling block 70. The heat exchanger may be of various constructions. For example, the heat exchanger may be an air-to-liquid heat exchanger or a liquid-to-liquid heat exchanger. The cooling loop may also comprise a pump to pump the cooling fluid into and out of the internal conduit 75 of the liquid cooling block 70.

As shown in FIG. 1, the fixing system 200 comprises a mounting bracket 210 for urging the liquid cooling block 70 against the heat-generating electronic component 50 and an indicator 220 which, based at least in part on a deformation thereof, provides an indication to a user regarding the pressure exerted between the liquid cooling block 70 and the heat-generating electronic component 50. The indicator 220 may also be referred to as an indicating device.

The mounting bracket 210 comprises a main portion 212 that, in use, overlies the liquid cooling block 70 such that at least part of the main portion 212 is aligned with the liquid cooling block 70 along a width and length of the liquid cooling block 70. Notably, the main portion 212 is the part of the mounting bracket 210 that, as the mounting bracket 210 approximates the liquid cooling block 70, urges the liquid cooling block 70 against the heat-generating electronic component 50. The main portion 212 spans a majority or an entirety of a length or width of the liquid cooling block 70 measured between opposite ends 77, 79 thereof.

The mounting bracket 210 also comprises an outer connecting portion 214 extending from the main portion 212 and configured to be fastened to the substrate 55 on which the heat-generating electronic component 50 is disposed. In use, the outer connecting portion 214 is positioned such that it does not overlie the liquid cooling block 70 and rather extends outwards therefrom. In this embodiment, the outer connecting portion 214 includes two connecting sections 216 disposed at opposite ends of the main portion 212 and interconnected by the main portion 212. It is contemplated that the outer connecting portion 214 could be configured differently in other embodiments. For instance, in some embodiments, the outer connecting portion 214 could extend from all four sides of the main portion 212.

In this embodiment, the two connecting sections 216 extend perpendicularly to the main portion 212. Each connecting section 216 defines two fastener openings 215 for receiving fasteners 227 (e.g., bolts) that connect the mounting bracket 210 to the substrate 55. Notably, in this example, the substrate 55 has fasteners 57 (e.g., nuts) that define threaded openings for threadedly receiving the fasteners 227 in order to secure the mounting bracket 210 to the substrate 55. As will be appreciated, as the outer connecting portion 214 is progressively fastened to the substrate 55 via the fasteners 57, 227, the fasteners 227 begin applying pressure on the outer connecting portion 214 which causes the main portion 212 to be pressed against the liquid cooling block 70. If the main portion 212 is pressed against the liquid cooling block 70 with excessive force as a result of the fasteners 57, 227 being overtightened, the heat-generating electric component 50 could be damaged. Therefore, it is desirable for the fastening connection between the fasteners 57, 227 not to be overtightened, but rather to be sufficiently tightened to ensure adequate contact between the liquid cooling block 70 and the heat-generating electronic component 50.

The indicator 220 provides a manner in which a user can assert whether the mounting bracket 210 is sufficiently fastened to the substrate 55. In particular, the indicator 220 is positioned so as to be compressed between the main portion 212 of the mounting bracket 210 and the liquid cooling block 50 as the outer connecting portion 214 is progressively fastened to the substrate 55 and deforms according to the pressure exerted thereon by the mounting bracket 210. A magnitude of the deformation of the indicator 220 in response to the outer connecting portion 214 being progressively fastened to the substrate 55 therefore provides a visual indication to the user of adequate contact between the liquid cooling block 70 and the heat-generating electronic component 50.

Figure 2:
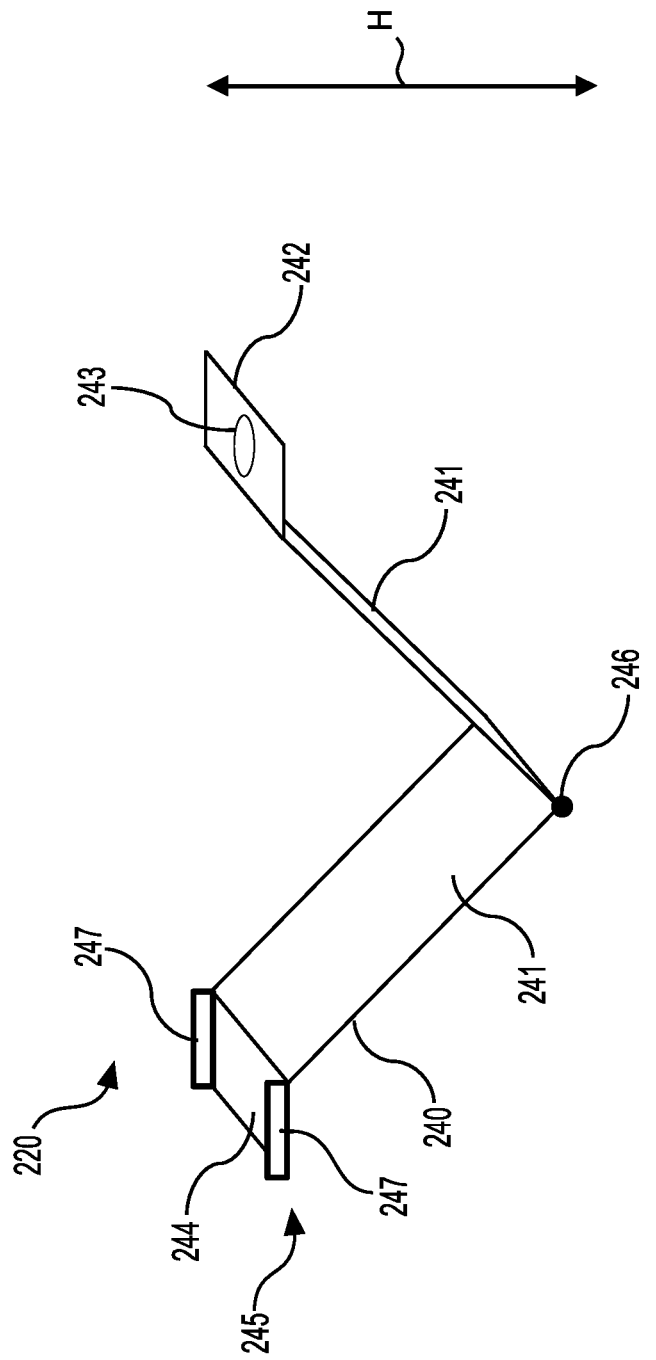
FIG. 2 is a perspective view, taken from a top, front, right side, of an indicator of a fixing system of the cooling assembly of FIG. 1.

As best shown in FIG. 2, in this embodiment, the indicator 220 comprises a resilient member 240 that is connected to the mounting bracket 210. The resilient member 240 is resilient in that it is deformable in response to getting compressed between the main portion 212 and the liquid cooling block 70 as the outer connecting portion 214 is progressively fastened to the substrate 55. Notably, the resilient member 240 is elastically deformable such that it deforms elastically from an initial configuration thereof to a deformed configuration and, once the force applied on the resilient member 240 that causes the resilient member 240 to be in the deformed configuration ceases, the resilient member 240 is biased back to its initial configuration. In this embodiment, the resilient member 240 is a resilient plate having two opposite end portions 242, 244 that are connected to the main portion 212 of the mounting bracket 210. Notably, the first end portion 242 of the resilient member 240 is fixedly connected to the main portion 212 of the mounting bracket 210 while the second end portion 244 is movably connected to the main portion 212 as will be described in greater detail below.

In this embodiment, the first end portion 242 defines an opening 243 through which a fastener (not shown) is inserted to connect the resilient member 240 to the mounting bracket 210. Notably, in this example, the main portion 212 defines a corresponding opening 225 (FIG. 1) through which the fastener is inserted to fasten the first end portion 242 to the main portion 212. The opening 225 is located along a part of the main portion 212 that does not overlie the liquid cooling block 70. Other fastening means between the first end portion 242 and the mounting bracket 210 are contemplated in alternative embodiments. For example, the main portion 212 of the mounting bracket 210 may define a slit in which a portion of the first end portion 242 may be inserted and locked. In other embodiments, the first end portion 242 could be welded (e.g., spot welded) to the mounting bracket 210.

In this embodiment, the second end portion 244 is slidable along a portion of the mounting bracket 210. In particular, the second end portion 244 is slidable along the main portion 212 of the mounting bracket 210, namely in a direction of elongation of the main portion 212. To that end, as shown in FIG. 2, the second end portion 244 has a guide 245 configured to guide the sliding movement of the second end portion 244 relative to the main portion 212 of the mounting bracket 210. The guide 245 may also be referred to as a guiding arrangement. In this embodiment, the guide 245 includes parallel guiding walls 247 that straddle opposite edges 213 of the main portion 212 (see FIG. 1). In use, the guiding walls 247 limit the movement of the second end portion 244 relative to the main portion 212 in a direction transversal to the direction of sliding movement of the second end portion 244 to keep the second end portion 244 generally centered relative to the main portion 212. More specifically, inner surfaces of the guiding walls 247 slide along the edges 123 of the main portion 212 to guide the sliding movement of the second end portion 244 along the main portion 212. It is contemplated that the guide 245 could be configured differently in other embodiments.

Figure 3:
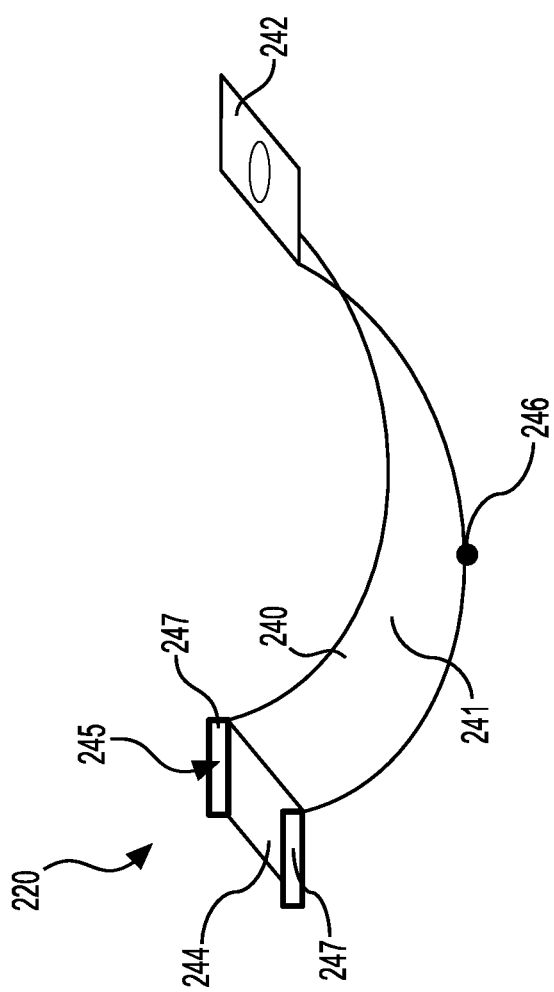
FIG. 3 is a perspective view, taken from a top, front, right side, of the indicator of the fixing system in accordance with another embodiment of the present technology.

The resilient member 240 also has a central body portion 241 extending between the first and second end portions 242, 244. In this embodiment, the resilient member 240 is biased such that, in an undeformed state of the resilient member 240 (i.e., at rest), the central body portion 241 has a generally concave shape defining a vertex 246 which, in use, is oriented towards the liquid cooling block 70. For instance, in this example, in the undeformed state of the resilient member 240, the central body portion 241 is generally V-shaped. It is contemplated that the central body portion 241 could have a different shape in other embodiments. For example, as shown in FIG. 3, in another embodiment, in the undeformed state of the resilient member 240, the central body portion 241 may be generally curved. Notably, the central body portion 241 could be arched relative to the first and second end portions 242, 244.

It is contemplated that the resilient member 240 could be configured differently in other embodiments. For instance, with reference to FIG. 8, in some embodiments, the resilient member 240 could be a spring that is fixed to the main portion 212 of the mounting bracket 210. In some cases, the spring could be integrally formed with the main portion 212 of the mounting bracket 210 such that the main portion 212 and the resilient member 240 are made from a continuous material. In such cases, the resilient member 240 is thus not slidably connected to the main portion 212.

The manner in which the fixing system 200 is used to fix the liquid cooling block 70 on the heat-generating electronic component 50 will now be described in greater detail. Broadly speaking, the liquid cooling block 70 is first positioned on the heat-generating electronic component 50 such that the external thermal transfer surface 76 is in thermal contact with the heat generating electronic component 50. With the resilient member 240 connected to the mounting bracket 210, the mounting bracket 210 is then positioned such that the main portion 212 thereof overlies the liquid cooling block 70. In this embodiment, the resilient member 240 is connected to the main portion 212 of the mounting bracket 210 such that the resilient member 240 is disposed between the main portion 212 and the liquid cooling block 70. The fasteners 227 are then inserted through the openings 215 of the mounting bracket 210 and received by the fasteners 57. At this stage, the cooling assembly 1000 is in an initial assembled configuration illustrated in FIG. 4A. Notably, in the initial assembled configuration, the vertex 246 of the resilient member 240 is in contact with the top surface of the liquid cooling block 70, but the resilient member 240 is not in a state of deformation that is indicative of the desired amount of pressure being exerted between the mounting bracket 210 and the liquid cooling block 70 for establishing adequate contact between the liquid cooling block 50 and the heat-generating electronic component 50. In other words, in the initial assembled configuration, the extent of deformation of the resilient member 240 is not associated with the desired amount of pressure being exerted between the mounting bracket 210 and the liquid cooling block 70.

The outer connecting portion 214 of the mounting bracket 210 is then progressively fastened to the substrate 55 on which the heat-generating electronic component 50 is disposed such as to approximate the main portion 212 of the mounting bracket 210 to the top surface of the liquid cooling block 70 (i.e., decreasing a distance between the main portion 212 and the top surface of the liquid cooling block 70). In particular, the fasteners 227 are further threadedly engaged with the fasteners 57 to lower the main portion 212 toward the top surface of the liquid cooling block 70. This urges the liquid cooling block 70 against the heat-generating electronic component 50 and the resilient member 240 therefore deforms between the main portion 212 and the liquid cooling block 70 in response to said progressive fastening of the outer connecting portion 214.

As mentioned above, the deformation of the resilient member 240 provides an indication to a user relating a current amount of pressure exerted between the mounting bracket 210 and the liquid cooling block 70. Notably, as pressure exerted on the liquid cooling block 70 by the mounting bracket 210 progressively increases, the central body portion 241 undergoes mechanical deformation which causes the second end portion 244 to slide along the main portion 212 of the mounting bracket 210. More specifically, as the outer connecting portion 214 is progressively fastened by tightening the engagement between the fasteners 57, 227, a height H of the resilient member 240, defined between the vertex 246 and the first end portion 242 (or the second end portion 244) along a direction normal to the top surface of the liquid cooling block 70, decreases since, in this embodiment, the second end portion 244 slides along the main portion 212 of the mounting bracket 210.

Figure 6:
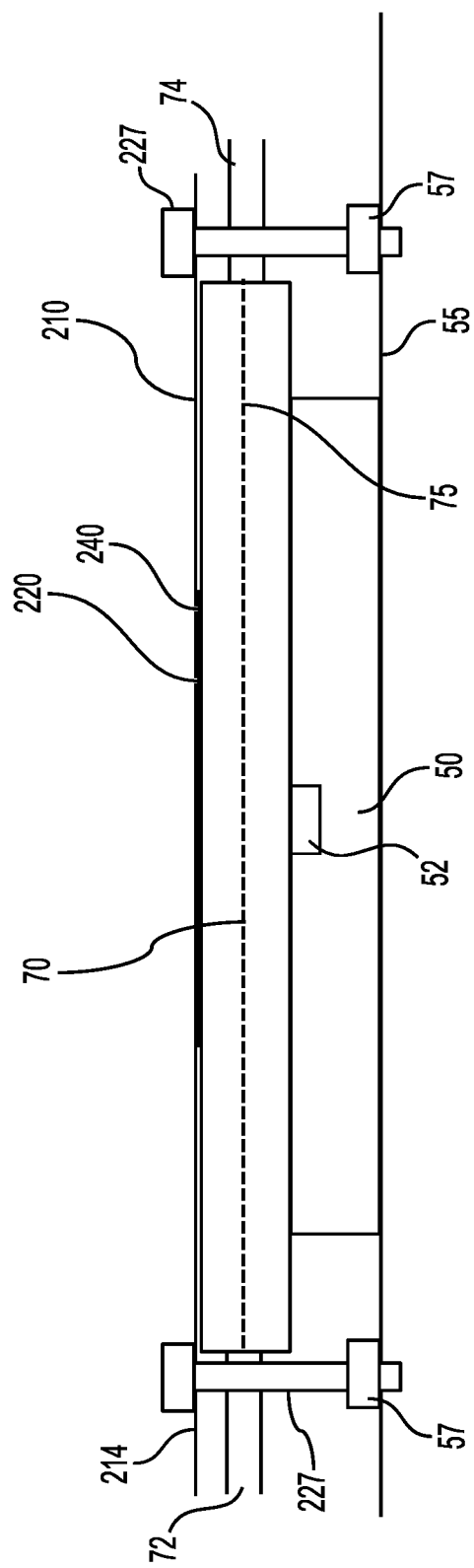
FIG. 6 is a front elevation view of the cooling assembly of FIG. 1, shown with a resilient member of the indicator deformed to indicate adequate contact between a liquid cooling block of the cooling assembly and a heat-generating electronic component.

The user ceases progressive fastening of the outer connecting portion 214 once the deformation of the resilient member 240 indicates that the desired amount of pressure is exerted between the mounting bracket 210 and the liquid cooling block 70 to establish adequate contact between the liquid cooling block 70 and the heat-generating electronic component 50. In this embodiment, the deformation of the resilient member 240 that is indicative of the desired amount of pressure exerted between the mounting bracket 210 and the liquid cooling block 70 corresponds to the resilient member 240 being in a substantially flat configuration as shown in FIG. 6 (the thickness of the resilient member 240 has been exaggerated for visibility thereof). Notably, in the substantially flat configuration of the resilient member 240, the main portion 212 of the mounting bracket 210 is in contact with the top surface of the liquid cooling block 70 and thereby urges the liquid cooling block 70 against the heat-generating electronic component 50 to ensure proper heat transfer therebetween.

It is contemplated that, in other embodiments, the deformation of the resilient member 240 that is indicative of the desired amount of pressure exerted between the mounting bracket 210 and the liquid cooling block 70 may be different. That is, in other embodiments, the resilient member 240 may not necessarily be in the substantially flat configuration to indicate that the desired amount of pressure is exerted between the mounting bracket 210 and the liquid cooling block 70. For instance, in some embodiments, the resilient member 240 may be deformed relative to its shape in the initial assembled configuration (FIG. 4A) yet still have a somewhat concave shape (e.g., a V-shape) that is indicative of the desired amount of pressure being exerted between the mounting bracket 210 and the liquid cooling block 70. As will be appreciated, the amount of deformation that the resilient member 240 undergoes to indicate the desired amount of pressure being exerted between the mounting bracket 210 and the liquid cooling block 70 is dependent on its initial shape, its dimensions and its material composition as these parameters will establish a resistance to deformation of the resilient member 240.

Figure 4A:
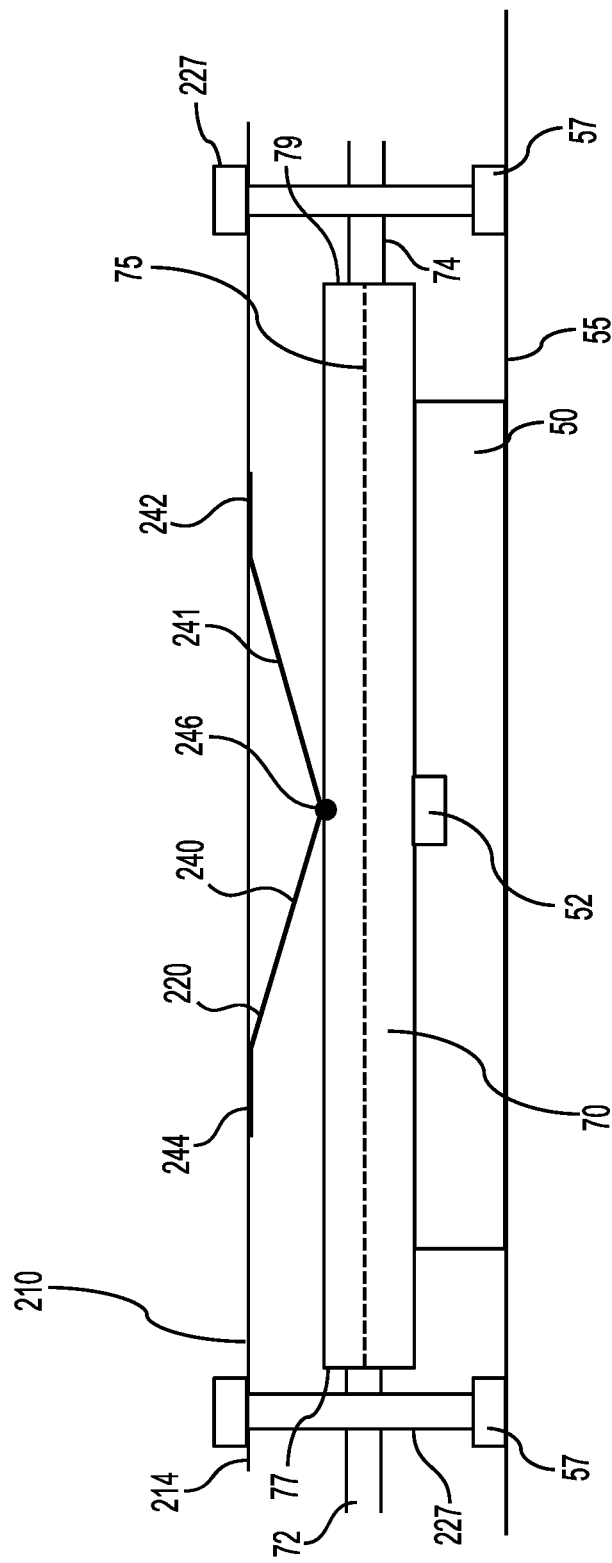
FIG. 4A is a front elevation view of the cooling assembly of FIG. 1, shown in an initial assembled configuration.

When the user wishes to remove the liquid cooling block 70 from its fixed position (e.g., to perform maintenance on the liquid cooling block 70), the fasteners 57, 227 are disengaged, thereby unfastening the outer connecting portion 214 of the mounting bracket 210 from the substrate 55. As the outer connecting portion 214 is unfastened from the substrate 55, the resistance posed on the mounting bracket 210 by the resilient member 240 forces the mounting bracket 210 away from the top surface of the liquid cooling block 70. The resilient member 240, which in this embodiment is elastically deformable, thus springs back at least substantially to its shape its in the initial assembled configuration (FIG. 4A).

Figure 4B:
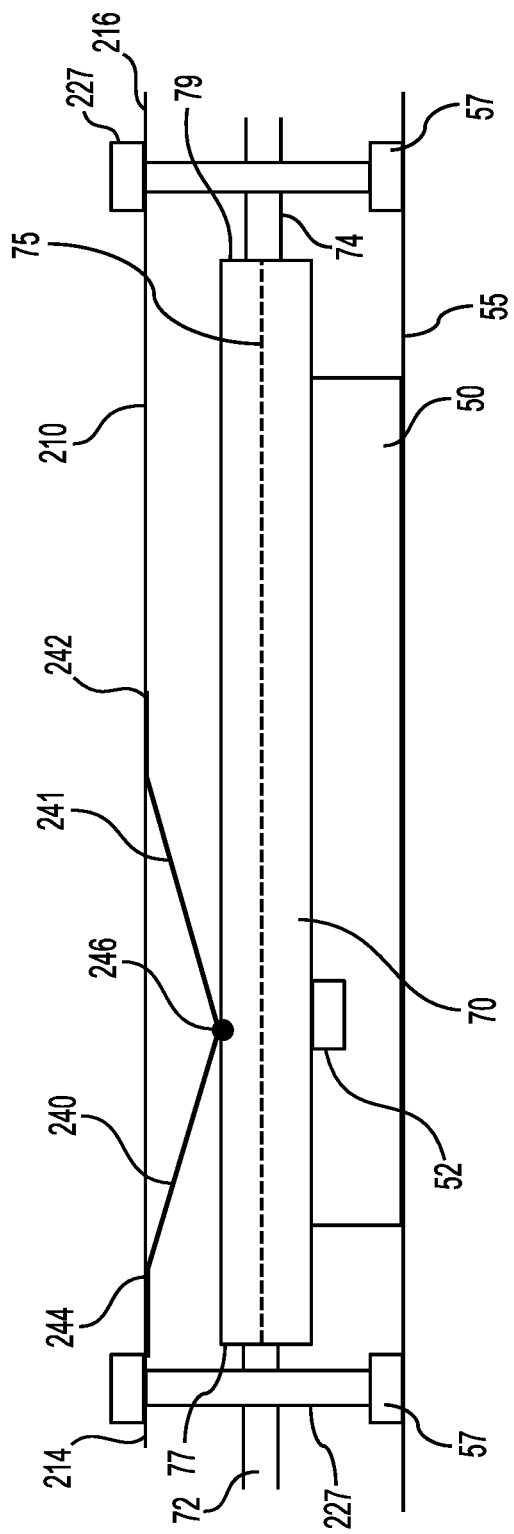
FIG. 4B is a front elevation view of the cooling assembly, shown in the initial assembled configuration, in accordance with another embodiment of the present technology.

In the above-described embodiment, the resilient member 240 is positioned such that its vertex 246 is substantially centered relative to the width and/or length of the liquid cooling block 70, namely because in that exemplary case, a die 52 of the heat-generating electronic component 50, which is a small block of semiconducting material that is prone to generating a significant amount of thermal energy, is centered relative to the width and length of the liquid cooling block 70. The resilient member 240 thus applies pressure on the liquid cooling block 70 at a point that is aligned with the die 52 such that an axis extending through the vertex 246 of the resilient member 240 along a height direction of the liquid cooling assembly 1000 traverses the die 52. However, it is contemplated that the resilient member 240 could be offset from the center of the width and length of the liquid cooling block 70. Notably, with reference to FIG. 4B, in some cases, the die 52 of the heat-generating electronic component 50 may be in a position other than the center of the liquid cooling block 70. As such, the resilient member 240 could be similarly positioned off-center from the liquid cooling block 70 such that its vertex 246 is aligned with the die 52 along the length and width of the liquid cooling block 70. As such, the fixing system 200 urges the liquid cooling block 70 toward the heat-generating electronic component 50 particularly at the die 52 to ensure proper heat transfer at the location of the die 52. Therefore, thermal energy generated by the die 52 is more likely to be properly collected by the liquid cooling block 70, due to properly maintained contact between the liquid cooling block 70 and the heat-generating electronic component 50 at the die 52.

It should be noted that the die 52 is merely an illustrative example of an area of the heat-generating electronic component 50 that is known to generate a high amount of thermal energy. Other sub-components or group of components of the heat-generating electronic component 50 may also be considered as areas generating high amount of thermal energy.

Figure 5:
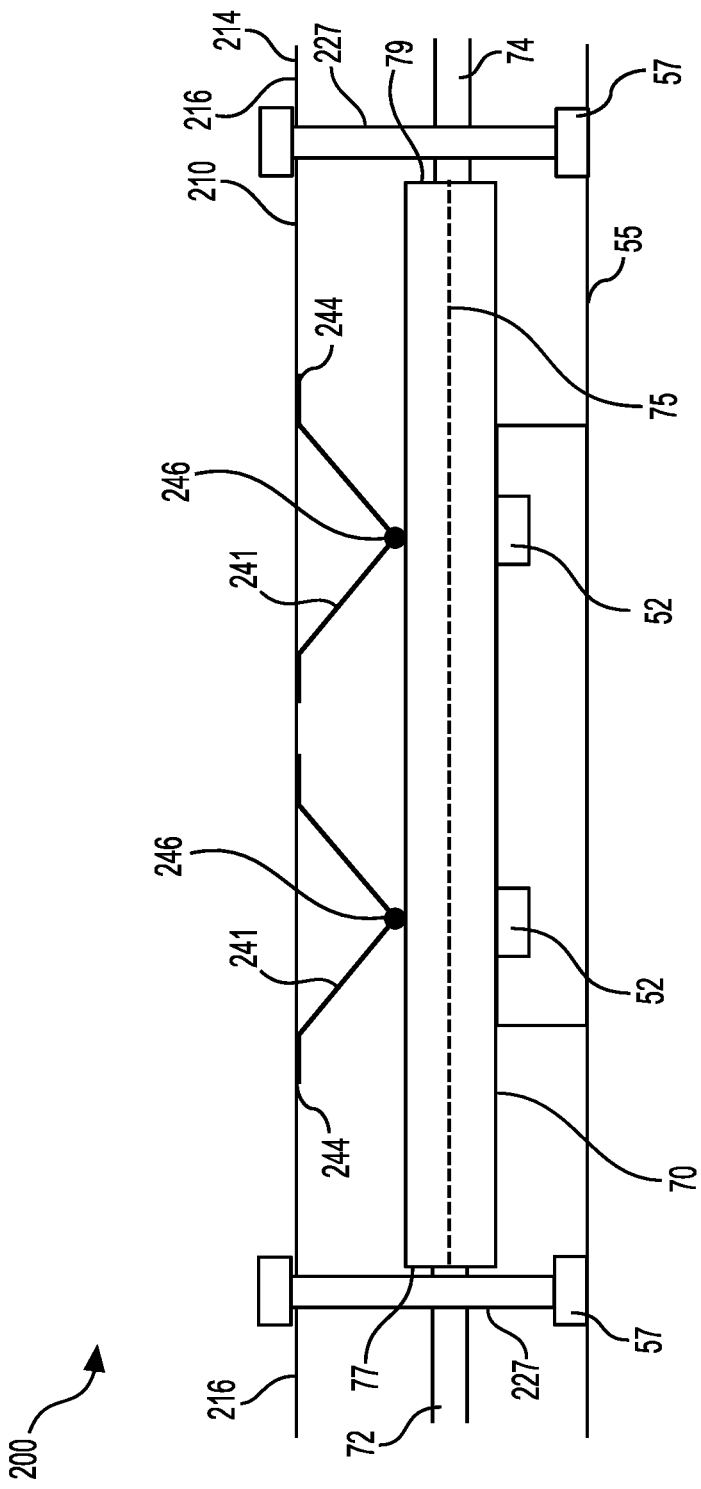
FIG. 5 is a front elevation view of the cooling assembly in accordance with another embodiment of the present technology.

Furthermore, with reference to FIG. 5, in some embodiments, the indicator 220 comprises two resilient members 240 of the type described above. Each of the resilient members 240 is connected to the mounting bracket 210 in the manner described above such that one end of each resilient member 240 is slidable along the main portion 212 of the mounting bracket 210. The two resilient members 240 are thus disposed between the liquid cooling block 70 and the mounting bracket 210 to secure adequate contact of the liquid cooling block 70 with the heat-generating electronic component 50 at the locations of the two dies 52. More specifically, the respective vertices 246 of the two resilient members 240 exert pressure onto the liquid cooling block 70 above the two dies 52.

In the illustrative embodiment of FIG. 5, the respective second end portions 244 of the two resilient members 240 are slidable along the main portion 210 of the mounting bracket 210. As such, the second end portions 244 of the two resilient members 240 slide along a common axis (i.e. their respective second ends 244 slide in a same direction or in opposite directions along the common axis). However, in alternative embodiments, it is contemplated that the mounting bracket 210 could comprise a plurality of main portions 212 extending between the two opposite connecting sections 216, each main portion 212 being similar to the main portion 212, and a respective resilient member 240 could be mounted to one of the main portions 212. As such, the second end portions 244 of the resilient members 240 may be slidable in parallel directions and not necessarily along a same axis.

Figure 8:
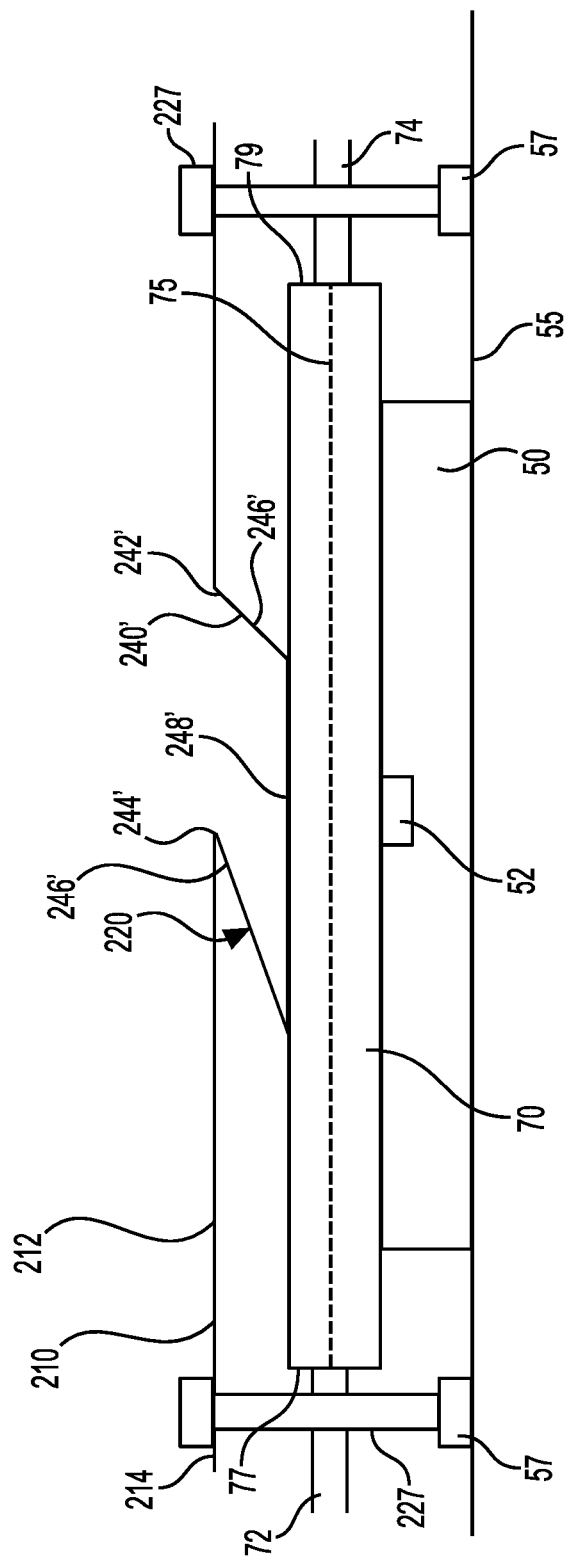
FIG. 8 is a front elevation view of the cooling assembly, shown in the initial assembled configuration, in accordance with another embodiment of the present technology.

It is contemplated that, in other embodiments, the indicator 220 may not be elastically deformable (e.g., plastically deformable). For instance, as shown in FIG. 8, in some embodiments, the indicator 220 could comprise a plastically deformable member 240' and function in a substantially similar manner as that described above with regard to the resilient member 240. In this alternative embodiment, the deformable member 240' is an integral part of the mounting bracket 210 and is connected to the main portion 212 thereof. The deformable member 240' has opposite ends 242', 244' that are integrally connected to the main portion 212 of the mounting bracket 210. Two leg portions 246' extend downward from respective ones of the ends 242', 244' towards a central contact portion 248' that is configured to contact the liquid cooling block 70. When the fasteners 227, 57 are tightened, the deformable member 240' undergoes compression which causes the leg portions 246' to progressively collapse and fold so that the deformable member 240' becomes flattened. In contrast with the resilient member 240, the deformable member 240' does not recover its original shape once the fasteners 227, 57 are disengaged.

Figure 7:
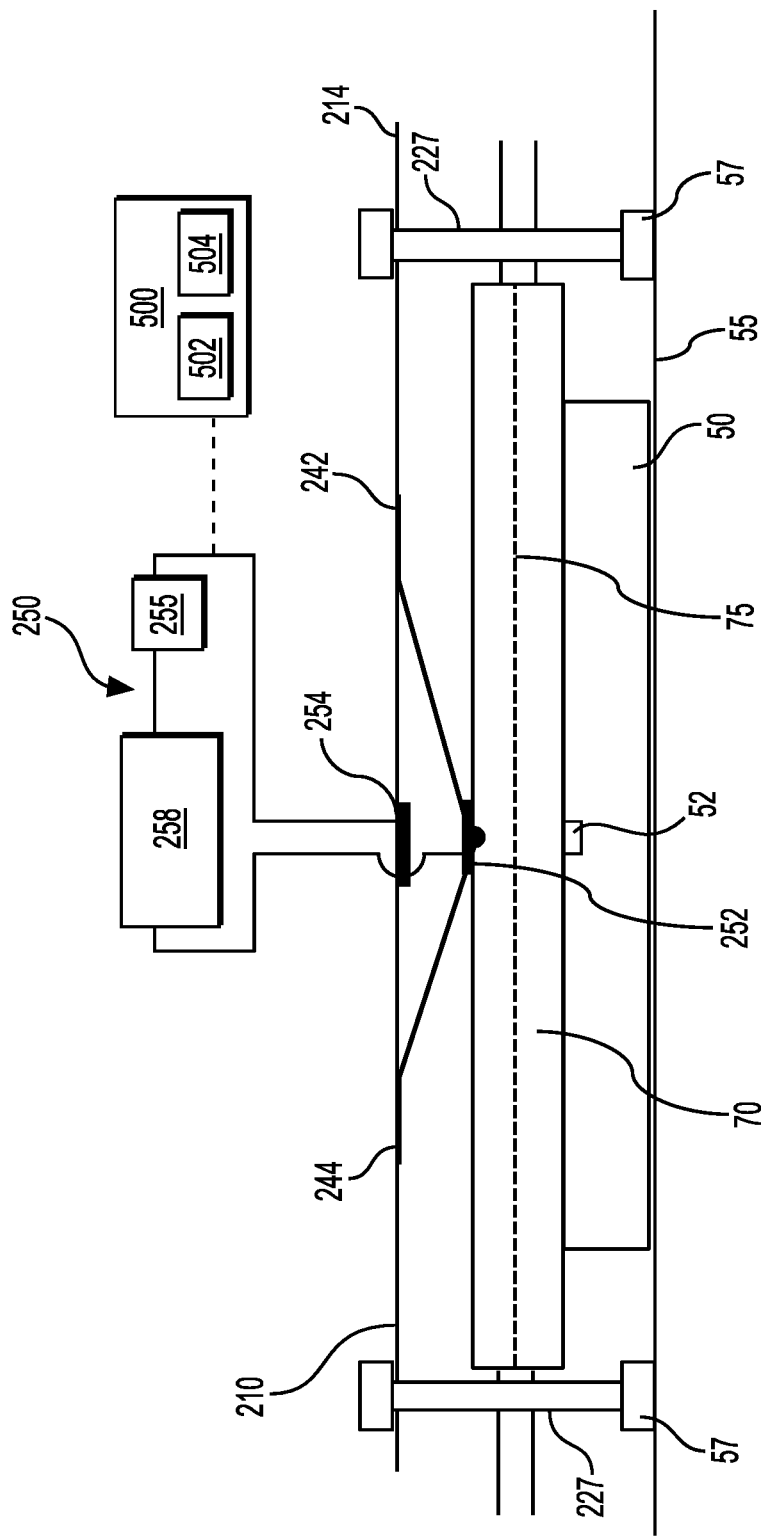
FIG. 7 is a front elevation view of the cooling assembly, shown in the initial assembled configuration, in accordance with another embodiment of the present technology.

With reference to FIG. 7, in some embodiments, the fixing system 200 further comprises an electric circuit 250 that collaborates with the indicator 220 to facilitate indication to the user that the desired amount of pressure is exerted between the mounting bracket 210 and the liquid cooling block 70 for establishing adequate contact between the liquid cooling block 70 and the heat-generating electronic component 50. In this embodiment, the electric circuit 250 comprises a first electrical contact 252 connected to the resilient member 240 and a second electrical contact 254 connected to the main portion 212 of the mounting bracket 210. In this example, the first electrical contact is disposed on the vertex 246 of the resilient member 240. In addition, the electric circuit 250 includes an electrical indication device 255 that is electrically connected to the first and second electrical contacts 254, and a power source 258 (e.g., a battery) for powering the electric circuit 250.

The first and second electrical contacts 252, 254 are operable to contact each other in response to the resilient member 240 being deformed by a given magnitude corresponding to the desired amount of pressure being exerted between the mounting bracket 210 and the liquid cooling block 70. As such, the electrical contacts 252, 254 function as a switch, whereby when the electrical contacts 252, 254 contact each other, the electric circuit 250 is in a closed state, and when the electrical contacts 252, 254 are spaced from each other, the electric circuit 250 is in an open state. As such, in the open state of the electric circuit 250, the first electrical contact 252 and the second electrical contact 254 are spaced from each other such that electricity is not transmitted to the electrical indication device 255. Notably, the current provided by the power source 258 is not able to flow through the electrical contacts 252, 254 and therefore does not reach the electrical indication device 255. In the closed state of the electric circuit 250, the first electrical contact 252 and the second electrical contact 254 are in contact and therefore in electrical communication with each other such that the current transmitted by the power source 258 is transmitted to the electrical indication device 255.

The electrical indication device 255 is provided to detect and indicate presence or absence of an electric current between the first and second electrical contacts 252, 254. For example, the electrical indication device 255 can be an ammeter, a light-emitting element (e.g., a light-emitting diode (LED)), or a sound-emitting device that can be monitored by the user when using the fixing system 200. As such, the electric circuit 250 may detect, via the electrical indication device 255, a non-null electric current flowing between the first and second electrical contacts 252, 254, representative of a contact between the indicator 220 (i.e. the vertex 246 of the resilient members 240 in this example) and the mounting bracket 210. The electrical indication device 255 thus emits a signal to the user that informs the user whether the electric circuit 250 is in the open state or the closed state, thereby allowing the user to ascertain whether the adequate amount of pressure is being applied by the mounting bracket 210 onto the liquid cooling block 70. For instance, in this embodiment, the electrical indication device 255 is a light-emitting element that lights up when the electric circuit 250 is in the closed state and turns off when the electric circuit 250 in the open state. Thus, when using the fixing system 200 that includes the electric circuit 250, the user ceases the progressive fastening of the outer connecting portion 214 to the substrate 55 based on activation of the electrical indication device 255.

In this alternative embodiment, the first and second end portions 242, 244 of the resilient member 240 are coated with electrically insulating material such that no electric current can flow from the resilient member 240 to the mounting bracket 210 via the first and second end portions 242, 244. For example, a rubber coating may cover the first and second end portions 242, 244 of the resilient member 240.

With continued reference to FIG. 7, it is contemplated that, in some embodiments, the electric circuit 250 could also be connected to a controller 500 that is configured to monitor a status of the electric circuit 250 and, thereby, whether a sufficient amount of pressure is exerted on the resilient member 240 to ensure adequate contact between the liquid cooling block 70 and the heat-generating electronic component 50. The controller 500 therefore detects when the electric circuit 250 is open or closed and can communicate with peripheral devices (e.g., a display monitor, a tablet, a phone, etc.) to indicate the status of the electric circuit 250. For example, if the fasteners 227 begin loosening their engagement with the fasteners 57 (e.g., due to vibrations to which the servers are subjected), then the electric circuit 250 may switch from the closed state to the open state. In such an event, the controller 500 detects this change of the electric circuit 250 to the open state and can send a signal indicating that an insufficient amount of pressure is being exerted on the resilient member 240. For instance, the controller 500 may be part of a computer of a building management system (BMS) that monitors and records data related to the functioning of a data center. The BMS may thus monitor the status of the electric circuit of various such fixing systems that fix in place respective liquid cooling blocks. In some embodiments, the controller 500 could, upon detecting the change of the state of the electric circuit 250, cause a peripheral device (e.g., a display monitor, a speaker, etc.) to emit a signal (e.g., visual or audio signal) indicative of the change of the state of the electric circuit 250.

As shown in FIG. 7, the controller 500 has a processor unit 502 for carrying out executable code, and a non-transitory memory unit 504 that stores the executable code in a non-transitory medium (not shown) included in the memory unit 504. The processor unit 502 includes one or more processors for performing processing operations that implement functionality of the controller 500. The processor unit 502 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory unit 135 may be a semiconductor memory (e.g., read-only memory (ROM) and/or random-access memory (RAM)), a magnetic storage medium, an optical storage medium, and/or any other suitable type of memory. While the controller 500 is represented as being one control unit in this implementation, it is understood that the controller 500 could comprise separate control units for controlling components separately and that at least some of these control units could communicate with each other.

It is to be understood that the electric circuit 250 and the controller 500 could also be implemented in relation to the deformable member 240' in a similar manner.

It should be understood that, in the context of the present specification, the liquid cooling block 70 being depicted above the heat-generating electronic component 50 is a mere example of an illustrative orientation, and that use of the words "above", "under", and related lexicon expressing relative positions of the components is only used to ease an understanding of the present technology. As an example, in FIGS. 4A, 4B and 5 to 7, the fixing system 200 is depicted above the liquid cooling block 70 which is disposed atop the heat-generating electronic component. This is a mere choice of representation, as the substrate 55 could extend, in use, along a vertical plane parallel to a gravity axis.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A fixing system for fixing a liquid cooling block on a heat-generating electronic component, the fixing system comprising:
   a mounting bracket comprising:
      a main portion configured to overlie at least part of the liquid cooling block in order to urge the liquid cooling block against the heat-generating electronic component; and an outer connecting portion extending from the main portion, the outer connecting portion being configured to be fastened to a substrate on which the heat-generating electronic component is disposed;
an indicator configured to be disposed between the main portion of the mounting bracket and the liquid cooling block, wherein, in use, the indicator is configured to undergo deformation in response to the outer connecting portion of the mounting bracket being progressively fastened to the substrate in order to provide an indication to a user that a desired amount of pressure is exerted between the mounting bracket and the liquid cooling block for establishing adequate contact between the liquid cooling block and the heat-generating electronic component,
wherein, the indicator comprises a resilient plate which, in an undeformed state, manifests a general concave shape containing a vertex that is configured to be in direct contact with a top surface of the liquid cooling block,
wherein the resilient plate is configured to be connected to the mounting bracket, the resilient plate being deformable in response to getting compressed between the main portion of the mounting bracket and the liquid cooling block, as the outer connecting portion is progressively fastened to the substrate; and
an electric circuit comprising:
a first electrical contact connected to the resilient plate;
a second electrical contact connected to the main portion of the mounting bracket, in use, the first and second electrical contacts being operable to contact each other in response to the resilient plate being deformed by a given magnitude corresponding to the desired amount of pressure being exerted between the mounting bracket and the liquid cooling block;
an electrical indication device for indicating presence of an electric current flowing between the first and second electrical contacts; and
a power source for powering the electric circuit,
in an open state of the electric circuit, the first electrical contact and the second electrical contact being spaced from each other such that electricity is not transmitted to the electrical indication device;
in a closed state of the electric circuit, the first electrical contact and the second electrical contact being in electrical communication with each other such that electricity is transmitted to the electrical indication device,
the electrical indication device being configured to, in the closed state of the electric circuit, indicate to the user that adequate contact is established between the liquid cooling block and the heat-generating electronic component.

2. The fixing system of claim 1, wherein a magnitude of the deformation of the indicator in response to the outer connecting portion being progressively fastened to the substrate provides a visual indication to the user of adequate contact between the liquid cooling block and the heat-generating electronic component.

3. The fixing system of claim 1, wherein part of the resilient plate is slidably connected to the mounting bracket.

4. The fixing system claim 3, wherein:
the resilient plate comprises a first end portion and a second end portion;
the first end portion is configured to be fixedly connected to the mounting bracket; and
the second end portion is configured to be slidably connected to the mounting bracket such that, in response to the outer connecting portion being progressively fastened to the substrate, the second end portion slides along the main portion of the mounting bracket.

5. The fixing system of claim 1, wherein the resilient plate is deformable into a flat configuration in response to the desired amount of pressure being exerted between the mounting bracket and the liquid cooling block.

6. The fixing system of claim 1, wherein the resilient plate is comprised of a metallic material, in which the resilient plate is electrically isolated from the mounting bracket.

7. A cooling assembly comprising:
the fixing system of claim 1 for fixing the liquid cooling block on the heat-generating electronic component, the liquid cooling block comprising an internal fluid conduit, an inlet and an outlet for respectively receiving and discharging cooling fluid from the internal fluid conduit, and an external thermal transfer surface configured to be in thermal contact with the heat-generating electronic component for cooling thereof.

8. A method for fixing a liquid cooling block on a heat-generating electronic component, comprising:
placing the liquid cooling block in thermal contact with the heat-generating electronic component;
positioning a mounting bracket such that a main portion thereof overlies the liquid cooling block;
attaching an indicator to the main portion of the mounting bracket such that the indicator is disposed between the main portion and the liquid cooling block, the indicator comprising a resilient plate which, in an undeformed state, manifests a general concave shape containing a vertex that is configured to be in direct contact with a top surface of the liquid cooling block,
wherein the concave shape of the indicator of the resilient plate is indicative of the desired amount of pressure being exerted between the mounting bracket and the liquid cooling block;
progressively fastening an outer connecting portion of the mounting bracket extending from the main portion to a substrate on which the heat-generating electronic component is disposed in order to urge the liquid cooling block against the heat-generating electronic component, the indicator deforming between the main portion and the liquid cooling block in response to said progressively fastening of the outer connecting portion; and
ceasing fastening of the outer connecting portion to the substrate based on a deformation of the indicator that indicates that a desired amount of pressure is exerted between the mounting bracket and the liquid cooling block to establish adequate contact between the liquid cooling block and the heat-generating electronic component,
wherein a first electrical contact is connected to the resilient plate;
a second electrical contact is connected to the main portion of the mounting bracket, the first and second electrical contacts being operable to contact each other in response to the resilient plate being deformed by a given magnitude corresponding to the desired amount of pressure being exerted between the mounting bracket and the liquid cooling block;
an electrical indication device is activated in response to the first and second electrical contacts being in electrical communication with each other; and ceasing fastening of the outer connecting portion to the substrate is based on activation of the electrical indication device.

* * * * *